Patented May 25, 1954

UNITED STATES PATENT OFFICE 2,679,512

2,679,512
ACIDIC ESTERS OF OXYPROPYLATED ETHYLENETETRAMINES

Melvin De Groote, University City, Mo., assignor to Petrolite Corporation, a corporation of Delaware No Drawing. Application May 14, 1951, Serial No. 226,307

10 Claims. (Cl. 260—475)

The present invention is a continuation-in-part of my copending applications, Serial Nos. 104,801 filed July 14, 1949 (now Patent 2,552,528, granted May 15, 1951),109,619 filed August 10, 1949 (now Patent 2,552,531, granted May 15, 1951), and 107,381 filed July 28, 1949 (now Patent 2,552,530, granted May 15, 1951).

The present invention is concerned with certain new chemical products, compounds, or compositions which have useful application in various arts. It includes methods or procedures for manufacturing said new chemical products, compounds or compositions, as well as the products, compounds, or compositions themselves.

Complementary to the above aspect of the invention herein disclosed is my companion invention concerned with the use of these particular chemical compounds, or products, as demulsifying agents in processes or procedures particularly adapted for preventing, breaking, or resolving emulsions of the water-in-oil type, and particularly petroleum emulsions. See my co-pending application, Serial No. 226,306, filed May 14, 1951, now Patent No. 2,626,916.

Said last aforementioned co-pending application, i. e., Serial No. 107,381, now Patent No. 2,552,530, is concerned, among other things, with certain high molal oxypropylation derivatives of monomeric polyamino compounds with the proviso that (a) the initial polyamine reactant be free from any radical having at least 8 uninterrupted carbon atoms; (b) the initial polyamino reactant having a molecular weight of not over 1800 and at least a plurality of reactive hydrogen atoms; (c) the initial polyamino reactant must be water-soluble; (d) the oxypropylation end product must be water-insoluble; (e) the oxypropylation end product be within the molecular weight range of 2,000 to 30,000 on an average statistical basis; (f) the solubility characteristics of the oxypropylation end product in respect to water must be substantially the result of the oxypropylation step; (g) the ratio of propylene oxide per initial reactive hydrogen atom must be within the range of 7 to 70; (h) the initial polyamino reactant must represent not more than 20% by weight of the oxypropylation end product on a statistical basis; (i) the preceding provisos are based on the assumption of complete reaction involving the propylene oxide and initial polyamino reactant; (j) the polyamino reactant must contain at least one basic nitrogen atom; and (k) the nitrogen atoms are linked by a carbon atom chain.

Furthermore, in said aforementioned co-pending application it was pointed out that such hydroxylated materials obtained by oxypropylation could be reacted with dicarboxy acids such as diglycollic acid to yield valuable derivatives which are satisfactory also for demulsification of petroleum emulsions.

The present invention is concerned with a fractional ester obtained from a polycarboxy acid and a polyhydroxylated material obtained by the oxypropylation of a polyamino reactant.

More specifically, the present invention is concerned with a fractional ester obtained from a polycarboxy acid and a compound derived in turn by the oxypropylation of triethylenetetramine or an equivalent tetramine as hereinafter specified, having six terminal hydroxyl radicals or the equivalent, i. e., labile hydrogen atoms susceptible to oxyalkylation.

The most suitable raw material is triethylenetetramine or such product treated with several moles of ethylene oxide or glycide, or a combination of the two, particularly triethylenetetramine treated with one to five, six or seven moles of ethylene oxide.

The initial tetramine must be characterized by (a) having 4 amino nitrogen atoms and preferably all being basic; (b) free from any radical having 8 or more carbon atoms in an uninterrupted group; (c) must be water-soluble; and (d) have a plurality of reactive hydrogen atoms preferably at least 3, 4 or 5.

Needless to say, the most readily available reactant, to wit, triethylenetetramine has 6 reactive hydrogen atoms and this would be true after treatment with ethylene oxide, for instance, 6 moles of ethylene oxide. However, reaction with glycide would provide as many as 12 reactive hydrogen atoms provided the molal ratio was still the same as before, to wit, 6 moles of glycide per mole of tetramine. On the other hand, if triethylenetetramine were treated with one mole of an alkylating agent so as to introduce an alkyl radical such as methyl, ethyl, propyl, butyl, hexyl, heptyl, or the like, or an aryl radical such as a phenyl radical, then and in that event the number of reactive hydrogen atoms might be decreased to few as two or three and still be acceptable for the instant purpose. If an alkyl radical or an alicyclic radical, such as a cyclohexyl radical, or an alkyl-aryl radical such as a benzyl radical, were introduced the basicity of the nitrogen atom would not be materially effected. However, the introduction of a phenyl radical would, of course, markedly affect the basicity of the nitrogen atom. For obvious reasons my choice is as follows:

(a) the use of triethylenetetramine rather than any substituted triethylenetetramine as described;

(b) the use of triethylenetetramine after treatment with 1 to 6 moles of ethylene oxide although a modestly increased amount of ethylene oxide can be used in light of what is said hereinafter, or (c) the use of a derivative obtained from triethylenetetramine after reaction with glycide, or a mixture of ethylene oxide and glycide.

Since reaction of triethylenetetramine with propylene oxide is invariably involved and since this oxyalkylation step was substantially the same as the use of ethylene oxide or glycide, for purpose of brevity further reference will be made to triethylenetetramine as illustrating the procedure regardless of what particular reactant is selected. It is not necessary to point out, of course, that the substituted triethylenetetramines, i. e., those where an alkyl radical, alicyclic radical, arylalkyl, or aryl group has been introduced can be subjected similarly to reaction with ethylene oxide, glycide, or a combination of the two.

I also want to point out it is immaterial whether the initial oxypropylation step involves hydrogen attached to oxygen or hydrogen attached to nitrogen. The essential requirement is that it be a labile or reactive hydrogen atom. Any substituent radical present must, of course, have less than 8 uninterrupted carbon atoms in a single group.

More specifically, then, the present invention is concerned with hydrophile synthetic products; said hydrophile synthetic products being the acidic fractional esters derived by reaction between (A) a polycarboxy acid and (B) high molal oxypropylation derivatives of monomeric tetramino compounds, with the proviso that (a) the initial tetramino reactant be free from any radical having at least 8 uninterrupted carbon atoms; (b) the initial tetramino reactant having a molecular weight of not over 800 and at least a plurality of reactive hydrogen atoms; (c) the initial tetramino reactant must be water-soluble; (d) the oxypropylation end product must be water-insoluble, and kerosene-soluble; (e) the oxypropylation end product be within the molecular weight range of 2,500 to 30,00 on an average statistical basis; (f) the solubility characteristics of the oxypropylation end product in respect to water and kerosene must be substantially the result of the oxypropylation step; (g) the ratio of propylene oxide per initial reactive hydrogen atom must be within the range of 7 to 70; (h) the initial tetramino reactant must represent not more than 20% by weight of the oxypropylation end product on a statistical basis; (i) the preceding provisos are based on the assumption of complete reaction involving the propylene oxide and initial tetramino reactant; (j) the nitrogen atoms are linked by an ethylene chain, and with the further proviso that the ratio of (A) to (B) be one mole of (A) for each hydroxyl radical present in (B).

What has been said previously in regard to the materials herein described and particularly with reference to fractional esters may be and probably is an over-simplication for reasons which are obvious on further examination. It is pointed out subsequently that prior to esterification the alkaline catalyst can be removed by addition of hydrochloric acid. Actually the amount of hydrochloric acid added is usually sufficient and one can deliberately employ enough acid, not only to neutralize the alkaline catalyst but also to neutralize the amino nitrogen atom or convert it into a salt. Stated another way, a trivalent nitrogen atom is converted into a pentavalent nitrogen atom, i. e., a change involving an electrovalency indicated as follows:

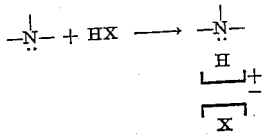

wherein HX represents any strong acid or fairly strong acid such as hydrochloric acid, nitric acid, sulfuric acid, a sulphonic acid, etc. in which H represents the acidic hydrogen atom and X represents the anion. Without attempting to complicate the subsequent description further it is obvious then that one might have esters or one might convert the esters into ester salts as described. Likewise another possibility is that under certain conditions one could obtain amides. The explanation of this latter fact resides in this observation. In the case of an amide, such as acetamide, there is always a question as to whether or not oxypropylation involves both amido hydrogen atoms so as to obtain a hundred per cent yield of the dihydroxylated compound. There is some evidence to at least some degree that a monohydroxylated compound is obtained under some circumstances with one amido hydrogen atom remaining without change.

Another explanation which has sometimes appeared in the oxypropylation of nitrogen-containing compounds particularly such as acetamide, is that the molecule appears to decompose under conditions of analysis and unsaturation seems to appear simultaneously. One suggestion has been that one hydroxyl is lost by dehydration and that this ultimately causes a break in the molecule in such a way that two new hydroxyls are formed. This is shown after a fashion in a highly idealized manner in the following way:

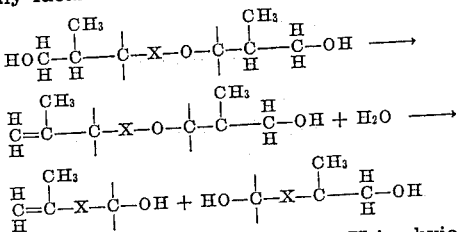

In the above formulas the large X is obviously not intended to signify anything except the central part of a large molecule, whereas, as far as a speculative explanation is concerned, one need only consider the terminal radicals, as shown. Such suggestion is of interest only because it may be a possible explanation of how an increase in hydroxyl value does take place which could be interpreted as a decrease in molecular weight. This matter is considered subsequently in the final paragraphs of Part 2. This same situation seems to apply in the oxypropylation of at least some polyalkylene amines and thus is of significance in the instant situation.

In the case of higher polyamines there is evidence that all the available hydrogen atoms are not necessarily attacked, at least under comparatively modest oxypropylation conditions, particularly when oxypropylation proceeds at low temperature as herein described, for instance, about the boiling point of water. For instance, in the case of diethylene triamine there is some evidence that one terminal hydrogen atom only in each of the two end groups is first attacked by propylene oxide and then the hydrogen atom attached to the central nitrogen atom is attacked. It is quite possible that three long propylene oxide chains are built up before the two remaining hydrogens are attacked and perhaps not attacked at all. This, of course, depends on the conditions of oxypropylation. However, analytical procedure is not entirely satisfactory in some instances in differentiating between a reactive hydrogen atom attached to nitrogen and a reactive hydrogen atom attached to oxygen.

In the case of triethylenetetramine the same situation seems to follow. One hydrogen atom on each of the two terminal groups is first attacked and then the two hydrogen atoms on the two intermediate nitrogen atoms. Thus four chains tend to build up and perhaps finally, if at all, the remaining two hydrogen atoms attached to the two terminal groups are attacked. In the case of tetraethylenepentamine the same approach seems to hold. One hydrogen atom on each of the terminal groups is attacked first, then the three hydrogen atoms attached to the three intermediate nitrogen atoms, and then finally, if at all depending on conditions of oxypropylation, the two remaining terminal hydrogen atoms are attacked.

If this is the case it is purely a matter of speculation at the moment because apparently there is no data which determines the matter completely under all conditions of manufacture, and one has a situation somewhat comparable to the acylation of monoethanolamine or diethanolamine, i. e., acylation can take place involving either the hydrogen atom attached to oxygen or the hydrogen atom attached to nitrogen.

As far as the herein described compounds are concerned it would be absolutely immaterial except that one would have in part a compound which might be the fractional ester and might also represent an amide in which only one carboxyl radical of a polycarboxylated reactant was involved. By and large, it is believed that the materials obtained are obviously fractional esters, for reasons which are apparent in light of what has been said and in light of what appears hereinafter.

However, in order to present the invention in its broadest aspect it had best be re-stated as follows: It is concerned with hydrophile synthetic products; said hydrophile synthetic products being a cogeneric mixture selected from the class consisting of acidic fractional esters, acidic ester salts, and acidic amido derivatives obtained by reaction between (A) a polycarboxy acid, and (B) high molal oxypropylation derivatives of monomeric tetramino compounds, with the proviso that (a) the initial tetramino reactant be free from any radical having at least 8 uninterrupted carbon atoms; (b) the initial tetramino reactant have a molecular weight of not over 800 and at least a plurality of reactive hydrogen atoms; (c) the initial tetramino reactant must be water-soluble; (d) the oxypropylation end product must be water-insoluble and kerosene-soluble; (e) the oxypropylation end product be within the molecular weight range of 2,500 to 30,000 on an average statistical basis; (f) the solubility characteristics of the oxypropylation end product in respect to water and kerosene must be substantially the result of the oxypropylation step; (g) the ratio of propylene oxide per initial reactive hydrogen atom must be within the range of 7 to 70; (h) the initial tetramino reactant must represent not more than 20% by weight of the oxypropylation end product on a statistical basis; (i) the preceding provisos are based on the assumption of complete reaction involving the propylene oxide and initial tetramino reactant; (j) the nitrogen atoms are linked by an ethylene chain, and with the final proviso that the ratio of (A) to (B) be one mole of (A) for each hydroxyl radical present in (B).

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. The specific application is described and claimed in my co-pending application, Serial No. 226,306, filed May 14, 1951, now Patent No. 2,626,916.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

For convenience, what is said hereinafter will be divided into three parts:

Part 1 is concerned with the preparation of the oxypropylation derivative of triethylene tetramine or equivalent initial reactants;

Part 2 is concerned with the preparation of the esters from the oxypropylated derivatives; and Part 3 is concerned with the nature of the oxypropylation derivatives insofar that such cogeneric mixture is invariably obtained.

PART 1

For a number of well know reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature—low reaction rate oxypropylations have been described very completely in U. S. Patent No. 2,448,664, to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

The initial reactants in the instant application contain at least 2 reactive hydrogens and for this reason there is possibly less advantage in using low temperature oxypropylation rather than high temperature oxypropylation. However, the reactions do not go too slowly and this particular procedure was used in the subsequent examples.

Since low pressure—low temperature low-reaction-speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet, pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave; such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective sreens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 6-hour period in a single step. Reactions indicated as being complete in 7 or 8 hours may have been complete in a lesser period of time in light of the automatic equipment employed. In the addition of propylene oxide, in the autoclave equipment as far as possible the valves were set so all the propylene oxide if fed continuously would be added at a rate so that the predetermined amount would react within the first 5 hours of the 8-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in an 8-hour period there would be an unquestionable speeding up of the reaction, by simply repeating the example and using 4, 5 or 6 hours instead of 8 hours.

When operating at a comparatively high temperature, for instances, between 150° to 200° C., an unreacted alkylene oxide such as propylene oxide, makes its presence felt in the increase in pressure or the consistency of a high pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gases gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specially designed for the purpose.

It is to be noted in the present instance one may or may not have basic nitrogen atoms present. For example, if a phenyl radical is attached to each nitrogen atom the initial tetramine is substantially non basic. However, if one employs triethylenetetramine there are present four basic nitrogen atoms and thus the addition of an alkaline catalyst can be eliminated in the early stages of oxypropylation or oxyethylation. This is illustrated subsequently by the fact that oxypropylation was permitted to go through the first stage without the addition of alkaline catalyst.

*Example 1a*

The particular autoclave employed was one with a capacity of approximately 15 gallons or on the average of about 125 pounds of reaction mass. The speed of the stirrer could be varied from 150 to 350 R. P. M. The initial charge was 12.62 pounds of triethylenetetramine. In the initial charge no catalyst was added. The reaction pot was flushed out with nitrogen, the autoclave sealed and the automatic devices adjusted and set for injecting 71.75 pounds of propylene oxide in a 5-hour period. The pressure regulator was set for a maximum of 35–37 pounds per square inch. However, in this particular step and in all succeeding steps the pressure never got over 33 pounds per square inch. In fact, this meant that the bulk of the reaction could take place and did take place at an appreciably lower pressure. This comparatively low pressure was the result of the fact that the reactant per se was basic. The propylene oxide was added at a rate of about 17½ pounds per hour and at a comparatively moderate temperature, to wit, 250°–255° F. (moderately higher than the boiling point of water). The initial introduction of propylene oxide did not start until the heating devices had raised the temperature to approximately 245° F. At the completion of the reaction a sample was taken and oxypropylation proceeded as in Example 2a, immediately following.

*Example 2a*

50.87 pounds of the reaction mass equivalent to 7.60 pounds of the polyamine and 43.27 pounds of propylene oxide, and identified as Example 1a, preceding, were permitted to stay in the reaction vessel and there was added .75 pound of caustic soda. The mixture was then reacted with 43.25 pounds of propylene oxide. The oxypropylation was conducted in substantially the same manner in regard to temperature and pressure as in Example 1a, preceding. The time period in this case was 6 hours. The propylene oxide was added at approximately 9 to 10 pounds per hour. At the end of the reaction period part of the sample was withdrawn and oxypropylation continued as described in Example 3a, following.

*Example 3a*

51.12 pounds of the reaction mass identified as Example 2a, preceding, and equivalent to 4.10 pounds of polyamine, 46.62 pounds of propylene oxide, and .40 pound of caustic soda, were permitted to stay in the reaction vessel. 43 pounds of propylene oxide were introduced in a 6-hour period. No additional catalyst was added. The conditions of reaction as far as temperature and pressure were concerned were substantially the same as in Example 1a, preceding. The propylene oxide was added at the rate of about 10 to 11 pounds per hour. At the completion of the reaction part of the reaction mass was withdrawn and the remainder subjected to further oxypropylation as described in Example 4a, immediately following.

*Example 4a*

47.62 pounds of the reaction mass identified as Example 3a, preceding, and equivalent to 2.07 pounds of polyamine, 45.35 pounds of propylene oxide and .20 pound of caustic soda, were permitted to stay in the autoclave. No additional catalyst was introduced. Conditions in regard to temperature and pressure were substantially the same as in Example 1a, preceding. In this instance the oxide was added in 7 hours. The amount of oxide added was 32.25 pounds. The addition was at the rate of approximately 6 pounds per hour. At the end of the reaction period part of the reaction mass was withdrawn and the remainder of the reaction mass subjected to further oxypropylation as described in Example 5a, following.

*Example 5a*

59.87 pounds of reaction mass identified as Example 4a, preceding, and equivalent to 1.57 pounds of polyamine, 58.15 pounds of propylene oxide, and .15 pound of caustic soda, were permitted to stay in the autoclave. No additional catalyst was added. This mass was subjected to reaction with 20 pounds of propylene oxide. The conditions of reaction were substantially the same as described in Example 1a as far as temperature and pressure were concerned. The period required to add the oxide was 9 hours. The oxide was added at the rate of 2 pounds per hour.

In other similar series I have used a catalyst at the very beginning, adding some caustic soda and particularly modestly more than above indicated; for instance, in a similar experiment I added initially 1.15 pounds of caustic soda and continued oxypropylation to give a molecular weight range as high as 9,000 to 10,000 and higher with a hydroxyl molecular weight between 5,000 and 6,000, or higher. These products so obtained at the higher molecular weight range had the same characteristics as far as solubility goes, as in Examples 4a and 5a, described in the paragraph following Table 1.

What has been said herein is presented in tabular form in Table 1 immediately following with some added information as to molecular weight and as to solubility of the reaction product in water, xylene and kerosene.

soluble in kerosene; and Examples 4a and 5a were insoluble in water, but soluble in both xylene and kerosene.

The final product, i. e., at the end of the oxypropylation step, was a somewhat viscous, pale amber to dark reddish amber fluid which was water-insoluble. This is characteristic of all the products obtained from the tetramine products herein described. Needless to say if more ethylene oxide radicals were introduced into the initial raw material the initial product is more water-soluble and one must go to higher molecular weights to produce water-insolubility and kerosene-solubility, for instance, molecular weights such as 10,000 to 12,000 or more on a theoretical basis, and 6,000 to 8,000 or 10,000 on a hydroxyl molecular weight basis. If, however, the initial tetramine compound is treated with one or more or perhaps several moles of butylene oxide then the reverse effect is obtained and it takes less propylene oxide to produce water-insolubility and kerosene-solubility. These products were, of course, alkaline due in part to the residual caustic soda employed. This would also be the case if sodium methylate were used as a catalyst.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

TABLE 1

| Ex. No. | Composition Before | | | Composition at end | | | | M. W. by Hyd. Determin. | Maximum Temp., °F. | Max. Pres., lbs. sq. in. | Time, hrs. |
|---|---|---|---|---|---|---|---|---|---|---|---|
| | Amine Amt., lbs. | Oxide Amt., lbs. | Catalyst, lbs. | Theo. Mol. Wt. | Amine Amt., lbs. | Oxide Amt., lbs. | Catalyst, lbs. | | | | |
| 1a | 12.62 | | | 972 | 12.62 | 71.75 | 1.25 | 852 | 225–230 | 35–37 | 5 |
| 2a | 7.60 | 43.27 | .75 | 1,805 | 7.60 | 86.52 | .75 | 1,284 | 250–255 | 35–37 | 6 |
| 3a | 4.10 | 46.62 | .40 | 3,335 | 4.10 | 89.62 | .40 | 2,280 | 250–255 | 35–37 | 6 |
| 4a | 2.07 | 45.35 | .20 | 5,625 | 2.07 | 77.60 | .20 | 3,400 | 250–255 | 35–37 | 7 |
| 5a | 1.57 | 58.15 | .15 | 7,395 | 1.57 | 78.15 | .15 | 4,370 | 250–255 | 35–37 | 9 |

Examples 1a and 2a were both soluble in water, soluble in xylene, and insoluble in kerosene; Example 3a was emulsifiable to insoluble in water, but soluble in xylene, and dispersible to in-

PART 2

As previously pointed out the present invention is concerned with acidic esters obtained from the oxypropylated derivatives described in Part 1, immediately preceding, and polycarboxy acids, particularly tricarboxy acids like citric and dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. In the present instance the hydroxylated compounds obtained as described in Part 1, preceding, contain nitrogen atoms which may or may not be basic. Thus, it is probable particularly where there is a basic nitrogen atom present that salts may be formed but in any event under conditions described the salt is converted into an ester. This is comparable to similar reactions involving the esterification of triethanolamine. Possibly the addition of an acid such as hydrochloric acid if employed for elimination of the basic catalyst also combines with the basic nitrogen present to form a salt. In any event, however, such procedure does not affect conventional esterification procedure as described herein.

Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950 to De Groote & Kiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as para-toluene sulfonic acid as a catalyst. There is some objection to this because in some instances there is some evidence that this acid catalyst tends to decompose or rearrange heat-oxypropylated compounds, and particularly likely to do so if the esterification temperature is too high. In the case of polycarboxy acids such as diglycollic acid, which is strongly acidic there is no need to add any catalyst. The use of hydrochloric acid gas has one advantage over para-toluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene, decalin, petroleum solvent, or the like, so that one has obtained approximately a 40% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, dark-reddish to amber liquid so obtained may contain a small amount of sodium sulfate or sodium chloride but, in any event, is preferably acceptable for esterification in the manner described.

It is to be pointed out that the products here described are not polyesters in the sense that there is a plurality of both tetramino radicals and acid radicals; the product is characterized by having only one tetramino radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the polyhydroxylated compound as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distallation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued and, of course, is at a higher temperature, to wit, about 160° to 170° C. If the carboxy reactant is an ahydride needless to say no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In a number of the examples the #7–3 solvent was entirely satisfactory, as, for example, in Examples 20b through 30b. This is particularly the case where the oxypropylated derivative showed decreased water-solubility. However, when the products showed significant water-solubility the difficulty arose that at the end of the esterification reaction the solvent and resultant or reaction mass was not homogeneous. Thus, in Examples 1b, 2b, 4b and 6b the solvent is shown as a mixture of #7–3 solvent and methanol. Approximately two-thirds the solvent indicated was solvent #7–3. When all the water had been eliminated methanol equal to approximately one-third the subsequent mixture was added so as to give a single phase system. In other examples, for instance, Examples 3b and 5b, methanol itself was not entirely satisfactory so that instead of adding one-third methanol (in reality 50% based on the solvent #7–3 present) there was added an equal weight of methanol and diethyl carbitol which is diethyleneglycol diethylether. Thus, the actual solvent consisted of approximately two-third solvent #7–3, one-sixth methanol, and one-sixth diethyleneglycol diethylether. In Examples 7b through 19b it was found that xylene seemed to be the most suitable to employ. Diethyleneglycol diethylether is manufactured by the Carbide & Carbon Chemicals Corporation, New York city. These solvent proportions can be varied somewhat without change, the object being merely to eliminate the water in the presence of water-insoluble solvents and then add suitable semi-polar compounds to give a homogeneous solution. Other obvious solvents will serve.

Another obvious procedure, of course, is merely to distill off a solvent such as xylene or solvent #7–3 and then dissolve the product in a semi-polar solvent, such as methanol, ethanol, propanol, etc. It is purely a matter of convenience to first employ a non-polar solvent (water-insoluble to eliminate the water during distillation and then add a suitable polar solvent (hydrophile) to give a single-phase system.

TABLE 2

| Ex. No. of Acid Ester | Ex. No. of Hydroxy Cmpd. | Theo. Mol. Wt. of H. C. | Theo. Hydroxyl Value of H. C. | Actual Hydroxyl Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 976 | 230 | 263 | 852 | 185 | Diglocolic Acid | 117.5 |
| 2b | 1a | 976 | 230 | 263 | 852 | 182 | Oxalic Acid | 108 |
| 3b | 1a | 976 | 230 | 263 | 852 | 192 | Maleic Anhydride | 87.6 |
| 4b | 1a | 976 | 230 | 263 | 852 | 188 | Phthalic Anhydride | 131 |
| 5b | 1a | 976 | 230 | 263 | 852 | 183 | Aconitic Acid | 150 |
| 6b | 1a | 976 | 230 | 263 | 852 | 180 | Citraconic Anhydride | 94.2 |
| 7b | 2a | 1,805 | 124 | 174.5 | 1,284 | 198 | Diglycolic Acid | 82.6 |
| 8b | 2a | 1,805 | 124 | 174.5 | 1,284 | 199 | Oxalic Acid | 77.2 |
| 9b | 2a | 1,805 | 124 | 174.5 | 1,284 | 196 | Maleic Anhydride | 60 |
| 10b | 2a | 1,805 | 124 | 174.5 | 1,284 | 196 | Phthalic Anhydride | 90.8 |
| 11b | 2a | 1,805 | 124 | 174.5 | 1,284 | 197 | Citraconic Anhydride | 68.6 |
| 12b | 2a | 1,805 | 124 | 174.5 | 1,284 | 212 | Aconitic Acid | 115 |
| 13b | 2a | 1,805 | 124 | 174.5 | 1,284 | 204 | Citraconic Anhydride | 71 |
| 14b | 3a | 3,335 | 67.3 | 98.4 | 2,280 | 197 | Diglycolic Acid | 46.1 |
| 15b | 3a | 3,335 | 67.3 | 98.4 | 2,280 | 197 | Oxalic Acid | 43.5 |
| 16b | 3a | 3,335 | 67.3 | 98.4 | 2,280 | 215 | Maleic Anhydride | 37.0 |
| 17b | 3a | 3,335 | 67.3 | 98.4 | 2,280 | 198 | Phthalic Anhydride | 51.5 |
| 18b | 3a | 3,335 | 67.3 | 98.4 | 2,280 | 201 | Citraconic Anhyd | 39.4 |
| 19b | 3a | 3,335 | 67.3 | 98.4 | 2,280 | 199 | Aconitic Acid | 61.0 |
| 20b | 4a | 5,625 | 39.9 | 66 | 3,400 | 200 | Diglycolic Acid | 31.5 |
| 21b | 4a | 5,625 | 39.9 | 66 | 3,400 | 215 | Oxalic Acid | 31.8 |
| 22b | 4a | 5,625 | 39.9 | 66 | 3,400 | 201 | Maleic Anhydride | 23.2 |
| 23b | 4a | 5,625 | 39.9 | 66 | 3,400 | 202 | Phthalic Anhydride | 35.2 |
| 24b | 4a | 5,625 | 39.9 | 66 | 3,400 | 205 | Citraconic Anhydride | 27.0 |
| 25b | 4a | 5,625 | 39.9 | 66 | 3,400 | 199 | Aconitic Acid | 40.6 |
| 26b | 5a | 7,395 | 30.4 | 51.3 | 4,370 | 200 | Diglycolic Acid | 24.5 |
| 27b | 5a | 7,395 | 30.4 | 51.3 | 4,370 | 200 | Oxalic Acid | 24.7 |
| 28b | 5a | 7,395 | 30.4 | 51.3 | 4,370 | 200 | Maleic Anhydride | 18.0 |
| 29b | 5a | 7,395 | 30.4 | 51.3 | 4,370 | 200 | Phthalic Anhydride | 27.4 |
| 30b | 5a | 7,395 | 30.4 | 51.3 | 4,370 | 200 | Aconitic Acid | 31.5 |

TABLE 3

| Ex. No. of Acid Ester | Solvent | Amt. Solvent (grs.) | Maximum Esterification Temp., °C | Time of Esterification (hrs.) | Water-Out (cc.) |
|---|---|---|---|---|---|
| 1b | #7-3, methanol | 435 | 130 | 1½ | 15.6. |
| 2b | do | 429 | 130 | 1½ | 15.0. |
| 3b | #7-3, methanol, diethyl Carbitol | 554, 554 | 130 | 1 | |
| 4b | #7-3, methanol | 426 | 128 | 1½ | |
| 5b | #7-3, methanol, diethyl Carbitol | 522 | 132 | 1 | 15.5. |
| 6b | #7-3, methanol | | | | |
| 7b | Xylene | 270 | 140 | ½ | Solidified. |
| 8b | do | 242 | 138 | 8 | 11.0. |
| 9b | do | 256 | 140 | 1½ | 33.6. |
| 10b | do | 287 | 120 | 1 | |
| 11b | do | | | 1 | |
| 12b | do | | | 1¾ | Solidified. |
| 13b | do | 315 | 166 | 5.0 | 12.0. |
| 14b | do | | | | Solidified. |
| 15b | do | 237 | 148 | 7 | 6.3. |
| 16b | do | 223 | 138 | 3½ | 18.8. |
| 17b | do | 252 | 147 | 1 | |
| 18b | do | 250 | 148 | 3 | |
| 19b | do | 240 | 145 | 1¾ | |
| 20b | #7-3 | 254 | 148 | 3¾ | 5.5. |
| 21b | do | 228 | 149 | 5 | 4.0. |
| 22b | do | 233 | 136 | 2½ | 13.7. |
| 23b | do | 224 | 153 | 1¾ | |
| 24b | do | 237 | 161 | 2¾ | |
| 25b | do | 232 | 144 | 1½ | |
| 26b | do | 236 | 164 | 5 | 4.0. |
| 27b | do | 228 | 150 | 5 | 3. |
| 28b | do | 228 | 160 | 2½ | 10.7. |
| 29b | do | 228 | 140 | 1½ | |
| 30b | do | 228 | 145 | 2½ | |
| | do | 228 | 162 | 5 | 3. |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated derivative and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst provided that the hydroxylated compound is not basic; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal, as the size of the molecule increases and the reactive hydroxyl radical represents a smaller fraction of the entire molecule more difficulty is involved in obtaining complete esterification.

Even under the most carefully controlled conditions of oxypropylation involving comparatively low temperature and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value by conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally pale amber to dark reddish-amber in color, and show moderate viscosity. They can be bleached with bleaching clays, filtering chars, and the like. However, for the purpose of demulsification or the like color is not a factor and decolorization is not justified.

In the above instance I have permitted the solvents to remain present in the final reaction mass. In other instances I have followed the same procedure using decalin or a mixture of decalin or benzene in the same manner and ultimately removed all the solvents by vacuum distillation. Appearance of the final products are much the same as the polyols before esterification and in some instances were somewhat darker in color and had a reddish cast and perhaps somewhat more viscous.

PART 3

In the hereto appended claims the demulsifying agent is described as an ester obtained from a polyhydroxylated material prepared from a tetramine. If one were concerned with a monohydroxylated material or a dihydroxylated material one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxypropylation involves the same sort of variations as appear in preparing high molal polypropylene glycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance. Needless to say, the same situation applies when one has oxypropylated polyhydric materials having 4 or more hydroxyls, or the obvious equivalent.

Usually no effort is made to differentiate between oxypropylation taking place, for example, at the primary alcohol radical or the secondary alcohol radical. Actually, when such products are obtained, such as a high molal polypropylene glycol or the products obtained in the manner herein described one does not obtain a single derivative such as $HO(RO)_nH$ or —$(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The proportions of such mixture represent the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a single monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to the copending application of De Groote, Wirtel and Pettingill, Serial No. 109,791, filed August 11, 1949 (now Patent 2,549,434, granted April 17, 1951).

However, momentarily referring again to a monohydric initial reactant it is obvious that if one selects any such simple hydroxylated compound and subjects such compound to oxyalkylation, such as oxyethylations, or oxypropylation, it becomes obvious that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}OH$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of propylene oxide per hydroxyl is 15 to 1. In a generic formula 15 to 1 could be 10, 20, or some other amount and indicated by $n$. Referring to this specific case actually one obtains products in which $n$ probably varies from 10 to 20, perhaps even further. The average value, however, is 15, assuming, as previously stated, that the reaction is complete. The product described by the formula is best described also in terms of method of manufacture.

The significant fact in regard to the oxypropylated polyamines herein described is that in the initial stage they are substantially all water-soluble, for instance, up to a molecular weight of 2,500 or thereabouts. Actually, such molecular weight represents a mixture of some higher molecular weight materials and some lower molecular weight materials. The higher ones are probably water-insoluble. The product may tend to emulsify or disperse somewhat because some of the constituents, being a cogeneric mixture, are water-soluble but the bulk are insoluble. Thus one gets emulsifiability or dispersibility as noted. Such products are invariably xylene-soluble regardless of whether the original reactants were or not. Reference is made to what has been said previously in regard to kerosene-solubility. For example, when the theoretical molecular weight gets somewhere past 4,000 or at approximately 5,000 the product is kerosene-soluble and water-insoluble. These kerosene-soluble oxyalkylation products are most desirable for preparing the esters. I have prepared hydroxylated compounds not only up to the theoretical molecular weight shown previously, i. e., about 8,000 but some which were much higher. I have prepared them, not only from the polyamine herein described, but also from oxyethylated or oxybutylated derivatives previously referred to. The exact composition is open to question for reasons which are common to all oxyalkylation. It is interesting to note, however, that the molecular weights based on hydroxyl determinations at this point were considerably less, in the neighborhood of a third or a fourth of the value at maximum point. Referring again to previous data it is to be noted, however, that over the range shown of kerosene-solubility the hydroxyl molecular weight has invariably stayed at two-thirds or five-eighths of the theoretical molecular weight.

It becomes obvious when carboxylic esters are prepared from such high molecular weight materials that the ultimate esterification product again must be a cogeneric mixture. Likewise, it is obvious that the contribution to the total molecular weight made by the polycarboxy acid is small. By the same token one would expect the effectiveness of the demulsifier to be comparable to the unesterified hydroxylated material. Remarkably enough, in many instances the product is distinctly better.

Having thus described my invention, what I claim as new and desire to obtain by Letters Patent, is

1. A hydrophile synthetic product which is the ester of (A) a polycarboxy acid with (B) a high molal oxypropylated monomeric tetramino compound with the proviso that (a) the monomeric tetramino compound be free from any radical having at least 8 uninterrupted carbon atoms; (b) the monomeric tetramino compound have a molecular weight of not over 800 and at least a plurality of reactive hydrogen atoms; (c) the oxypropylated monomeric tetramino compound have a molecular weight of 2500 to 30,000 on an average statistical basis; (d) the ratio of propylene oxide per initial reactive hydrogen atom of the monomeric tetramino compound be within the range of 7 to 70; (e) the monomeric tetramino compound represent not more than 20% by weight of the oxypropylated monomeric tetramino compound on a statistical basis; (f) the preceding provisos being based on the assumption of complete reaction between the propylene oxide and the monomeric tetramino compound; (g) the nitrogen atoms are linked by ethylene radicals; (h) the ratio of polycarboxy acid to oxypropylated monomeric tetramino compound being one mole of the former for each reactive hydrogen atom of the latter; and (i) the polycarboxy acid be selected from the class consisting of isocyclic and acyclic dicarboxy and tricarboxy acids composed of oxygen, carbon and hydrogen and having not more than 8 carbon atoms.

2. A product as in claim 1 in which at least one of the nitrogen atoms of the oxypropylated monomeric tetramino compound is basic.

3. A product as in claim 1 in which at least two nitrogen atoms of the oxypropylene monomeric tetramino compound are basic.

4. A product as in claim 3 in which the polycarboxy acid is a dicarboxy acid.

5. A product as in claim 4 in which the monomeric tetramino compound is triethylenetetramine.

6. The product of claim 1 wherein the dicarboxy acid is diglycollic acid.

7. The product of claim 1 wherein the dicarboxy acid is maleic acid.

8. The product of claim 1 wherein the dicarboxy acid is phthalic acid.

9. The product of claim 1 wherein the dicarboxy acid is citraconic acid.

10. The product of claim 1 wherein the dicarboxy acid is succinic acid.

No references cited.